(12) United States Patent
Hanley et al.

(10) Patent No.: US 8,427,102 B2
(45) Date of Patent: Apr. 23, 2013

(54) DYNAMIC CURRENT LIMITING CHARGING CIRCUIT

(75) Inventors: Michael Hanley, Lawrenceville, GA (US); Wayne Anderson, Dacula, GA (US)

(73) Assignee: Motorola Mobility LLC, Libertyville, IL (US)

( * ) Notice: Subject to any disclaimer, the term of this patent is extended or adjusted under 35 U.S.C. 154(b) by 323 days.

(21) Appl. No.: 12/640,249

(22) Filed: Dec. 17, 2009

(65) Prior Publication Data

US 2011/0151942 A1    Jun. 23, 2011

(51) Int. Cl.
*H02J 7/00* (2006.01)
*H02J 7/16* (2006.01)

(52) U.S. Cl.
USPC ........... 320/108; 320/114; 320/145; 320/151; 320/156

(58) Field of Classification Search ............. 320/107, 320/108, 109, 110, 112, 113, 114, 115, 127, 320/128, 129, 130, 131, 132, 133, 134, 135, 320/136, 137, 141, 145, 148, 149, 151, 152, 320/156, 160, 161, 157
See application file for complete search history.

(56) References Cited

U.S. PATENT DOCUMENTS

| | | | |
|---|---|---|---|
| 6,028,413 A * | 2/2000 | Brockmann | 320/108 |
| 6,040,680 A | 3/2000 | Toya et al. | |
| 6,100,663 A * | 8/2000 | Boys et al. | 320/108 |
| 8,004,118 B2 * | 8/2011 | Kamijo et al. | 307/104 |
| 2005/0231986 A1 | 10/2005 | Kasprzak et al. | |
| 2008/0238370 A1 * | 10/2008 | Carrier et al. | 320/134 |
| 2009/0009006 A1 * | 1/2009 | Jin et al. | 307/104 |
| 2009/0026844 A1 * | 1/2009 | Iisaka et al. | 307/104 |
| 2009/0174364 A1 * | 7/2009 | Onishi et al. | 320/108 |
| 2009/0189565 A1 * | 7/2009 | Cheng et al. | 320/108 |
| 2010/0073177 A1 * | 3/2010 | Azancot et al. | 340/657 |
| 2011/0074349 A1 * | 3/2011 | Ghovanloo | 320/108 |
| 2011/0084656 A1 * | 4/2011 | Gao | 320/108 |

FOREIGN PATENT DOCUMENTS

| | | |
|---|---|---|
| EP | 1291999 A1 | 3/2003 |
| EP | 1739818 A1 | 1/2007 |

OTHER PUBLICATIONS

Patent Cooperation Treaty, International Search Report and Written Opinion of the International Searching Authority for International Application No. PCT/US2010/060001, Jul. 28, 2011, 14 pages.

* cited by examiner

*Primary Examiner* — Edward Tso
*Assistant Examiner* — Alexis Boateng

(57) ABSTRACT

An apparatus is provided for an electronic device. The apparatus includes a dynamic electrical load, a secondary power coil receiver module that inductively receives a current from a primary coil of an power conversion system, a means for monitoring a current in the secondary receiver module being delivered to the dynamic load, a means for transmitting a power control signal to the power conversion system through the secondary charging coil, a current monitoring circuit that measures a current delivered to the dynamic load and a current limiter circuit that limits the current to the dynamic load based upon the measured charging current.

13 Claims, 4 Drawing Sheets

DYNAMIC CURRENT LIMITING CHARGING CIRCUIT

FIELD OF THE INVENTION

The field of the invention relates to cellular telephones and more particularly to charging circuits for cellular telephones. It could also be implemented in other handheld consumer electronics

BACKGROUND OF THE INVENTION

Cellular telephones are generally known. Such devices are typically provided with a keypad through which a user can enter the telephone number of a called party. Once the user has entered the telephone number of a called party, a processor within the cellular telephone may scan a set of frequencies to identify a control channel of a nearby base station. Upon locating a base station, the cellular telephone may transmit an access request including the called telephone number along with an internal identifier of the cellular telephone.

The base station may compare the internal identifier of the cellular telephone with a set of authorized users to determine if the cellular telephone is authorized to use the cellular system. If the cellular telephone is authorized to use the system, the base station may transmit a channel assignment to the cellular telephone and set up of a connection with the called party. The cellular telephone may tune to the assigned channel and the user may begin conversing with the called party.

While most cellular telephones are provided with a microphone and speaker, many other cellular telephones are also provided with a Bluetooth headset. In this case, the user may wear a Bluetooth headset that communicates with the cellular telephone on a first channel while the cellular telephone operates as a relay to relay the audio information between the user and other party to the conversation.

Many current generation cellular telephones are provided with charging stations that simply require placing the cellular telephone on top of the charger. While such charging stations work well, the use of the cellular telephone while charging can interfere with normal operation of the cellular telephone and/or the charging system. Accordingly, a need exists for improved methods of controlling the charging system.

DETAILED DESCRIPTION OF AN ILLUSTRATED EMBODIMENT

Figure 1:
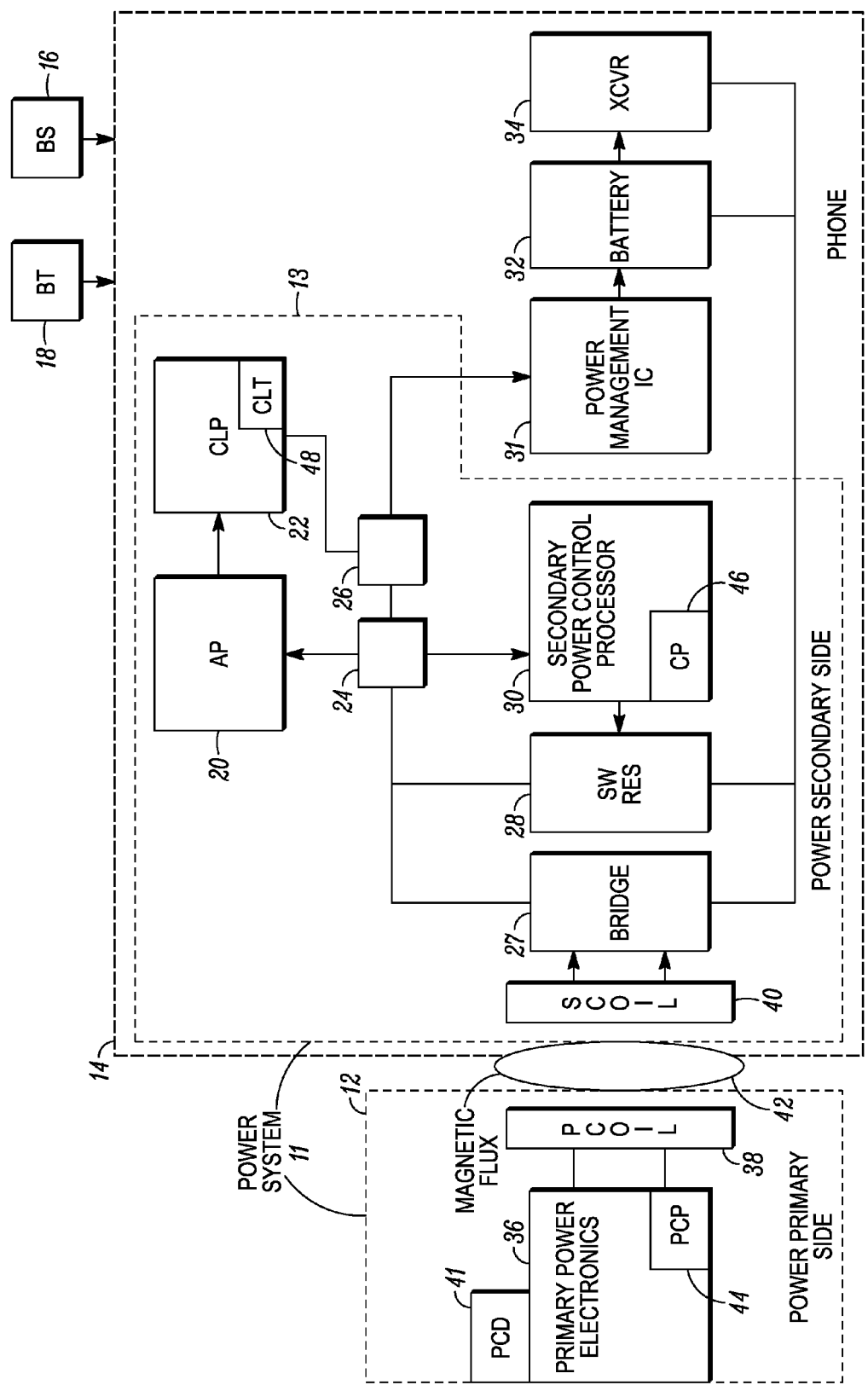
FIG. 1 is a simplified block diagram of a cellular telephone with inductive charging circuit shown generally in accordance with an illustrated embodiment of the invention.

FIG. 1 is a simplified block diagram of a cellular telephone system 10 shown generally in accordance with an illustrated embodiment of the invention. The cellular telephone system 10 may include a portable cellular telephone 14 which contains the power secondary side receiver module 13, and a power primary side 12. The cellular telephone 14 may operate on a time division multiplexed format under any of a number of different standards (e.g., Global System for Mobile Communications (GSM)).

To use the cellular telephone 14, a user may enter a telephone number of a called party through a keypad of the phone 14 and activate a SEND button. In response, a processor within the cellular telephone 14 may search for a control channel of a local base station 16 and transmit an access request. The access request may include the entered telephone number of the called party as well as an electronic serial number of the phone 14.

The base station 16 may receive the access request and process the request in a known manner. The base station 16 may first verify that the phone 14 is authorized to operate in the network. Once authorization is verified, the base station 16 may set up a voice channel between the user and called party. Once the voice channel has been set up, the user and called party may begin conversing.

Alternatively, a calling party may wish to place a telephone call to the phone 14. In this case, upon activation, the phone 14 may register its presence with a local base station 16. Upon detecting a call directed to the phone 14, the base station 16 may send an alert to the phone 14 notifying the phone of the incoming call. The user may activate the SEND button to accept the call. Once accepted, the user and caller may converse in a normal manner.

The phone 14 may be equipped to operate as a speaker phone and/or in conjunction with a Bluetooth headset 18. In either case, the phone 14 may be used in a hands free mode.

The power system 11 may be constructed to inductively couple a charging current to a battery 32 of the phone 14. In this regard, the power primary side 12 which is external to the phone 14 may include an external or internal power conversion device 41, primary power electronics 36 and a primary power transfer coil 38. The primary coil 38 of the power primary side 12 may be hard-wired to the power conversion system 36, 41. The secondary power coil 40, which is part of the power secondary side module 13 is located inside a housing of the phone 14 and is inductively coupled to the primary coil 38 of the power primary side 12. In this regard, whenever the phone 14 is placed on top of the power primary 12, the primary coil 38 couples a magnetic flux 42 into the secondary coil 40 through the bridge 27 to charge a battery 32 of the phone 14.

Figure 2:
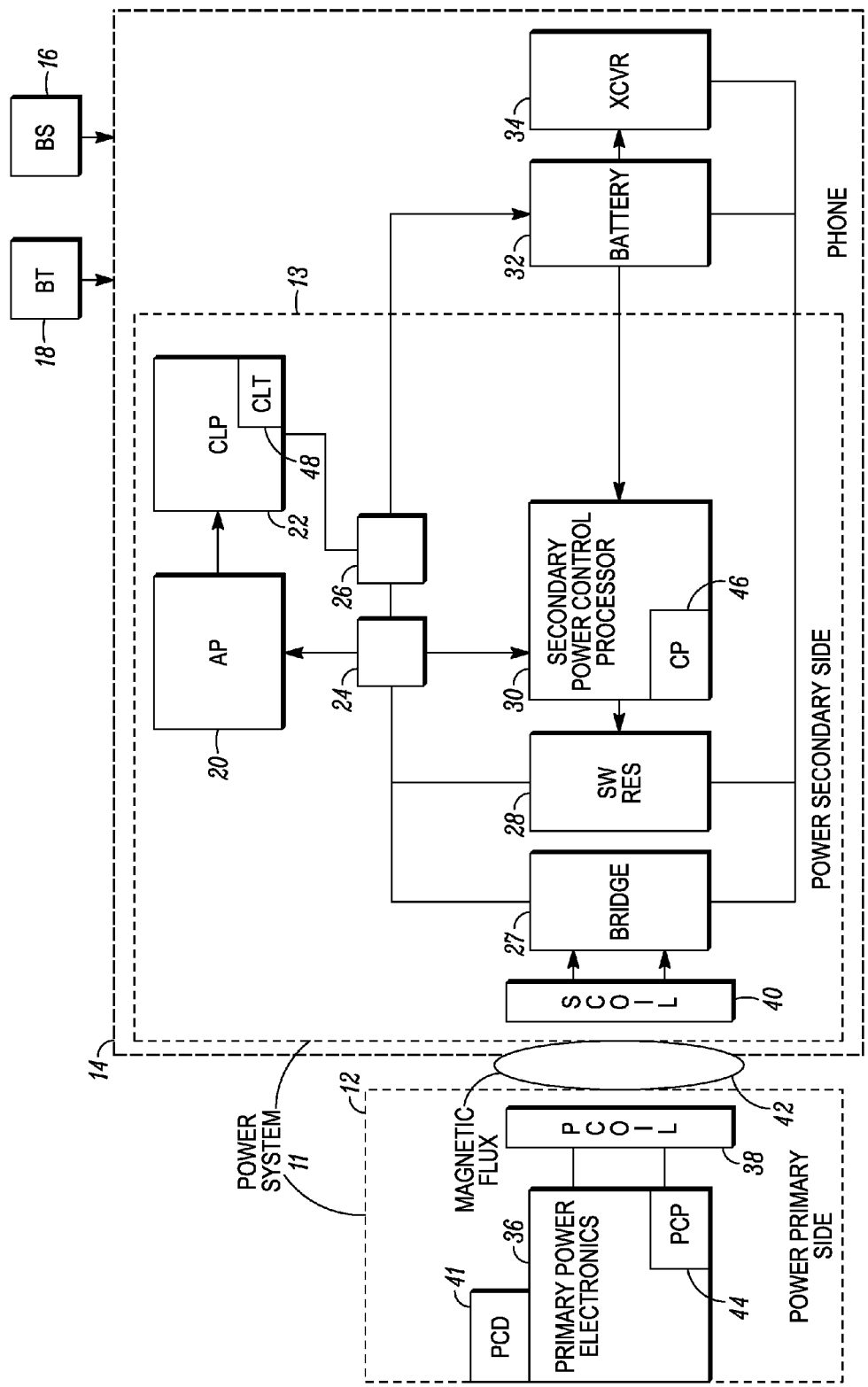
FIG. 2 is a simplified block diagram of a cellular telephone with inductive charging circuit shown generally in accordance with an alternate illustrated embodiment of the invention.

Control of the charging current into the phone 14 may be accomplished by a secondary power control processor 30 and power management IC 31. The power management IC 31 may be separate or incorporated into the secondary power control processor 30 (as shown in FIG. 2). In this regard, the secondary power control processor 30 and power management IC 31 monitor a charge state of the battery 32 via an appropriate charge state indicator (e.g., voltage) and control a charge current accordingly.

The secondary power control processor 30 controls the power presented to the phone 14 through the transmission of charge control packets 46 transferred through the secondary and primary coils 40, 38 to a primary control processor 44 located within the primary power electronics 36. The secondary power control processor 30 transmits the charge control packets 46 by modulating the load through primary coil 38. In this regard, the secondary power control processor 30 activates and deactivates a switch/resistor combination 28. Each time that the secondary power control processor 30 activates (opens and closes) the switch of the switch/resistor combination 28, the change in load is reflected back though the secondary power coil 40 to the primary power coil 38. The primary control processor 44 monitors the impedance reflected back through the primary coil 38. The primary control processor 44 detects changes in load from the power secondary side 13 and decodes these delta loads into a data stream of ones and zeros to form data messages (packets) used to control or adjust transmitted power from the power primary side 12. It has been found that operation of the phone 14 while being charged can result in disruption of communication from the secondary power control processor 30 to the primary control processor 44. For example, when the phone 14 is placed on the power primary side 12 and is also used in a hands free mode using the Bluetooth headset 18 or by operating the phone 14 in speaker mode, the communication packets 46 may become corrupted upon decoding by the primary control processor 44. Corruption can occur due to the switching of the transceiver 34 in the phone 14 between activated and deactivated states while the processor 30 is trying to transfer control packets 46. Activating and deactivating the transceiver 34 changes the impedance of the phone 14 (as seen through the secondary coil 40) in a manner similar to activation of the switch/resistor combination 28. Other dynamic loads caused by the phone 14 or other consumer electronic devices using this type of power charging system may also cause data corruption The problem of disruption of communication between the secondary power control processor 30 and primary control processor 44 has been found to be exacerbated by a charge level of the battery 32. For example, if the battery 32 is near a fully charged state, then the secondary power control processor 30 would be sending charge control packets 46 requesting a low level of charging current. On the other hand, if the transceiver 34 were to be activated, then the reduced impedance causes a relatively significant increase in current flow from the battery 32 and secondary coil 40. This increase in current flow can also cause the primary control processor 44 to erroneously conclude an unauthorized power/charger secondary 13 has been presented to the power charger primary 12 resulting in discontinuation of power. In order to avoid corruption of the charge control packets 46, the power secondary side 13 uses a current limiting process. In this regard, a current monitoring circuit including an averaging processor 20 monitors the current delivered to the power management IC 31 and/or transceiver 34 via a current sensing device (e.g., a resistor) 24. The current detected via the current sensing device 24 is averaged within the processor 20. The average value and instantaneous values of current are transferred to a current limiting circuit including a current limit processor 22. The average current measured through the averaging processor 20 is used as a basis for creating a current limit threshold value 48.

The threshold value 48 may be generated within the averaging processor 20 or current limit processor 22. In either case, instantaneous current values from the current sensing device 24 are compared with the threshold value 48 within the current limit processor 22. If the instantaneous current value exceeds the threshold value, then the current limit processor 22 begins to limit the current via a current control device (e.g., a variable impedance device such as a transistor) 26.

The threshold value 48 may be based upon a rolling average of all current values measured by the averaging processor 20 or upon peak values. The threshold value 48 may also be derived by adding a predetermined value to the measured average. For example, if the phone 14 draws an average current of 500 mA, then the threshold value may be found by adding a predetermined current value (e.g., 20 mA) to the measured value (e.g., 500 mA) to arrive at a threshold value of 520 mA.

By monitoring the instantaneous current, the averaging processor 20 dynamically controls the current threshold value 48. By controlling the threshold value, the secondary coil 40 does not see the current surges associated with activation of the transceiver 34 or other dynamic electrical loads.

Figure 3:
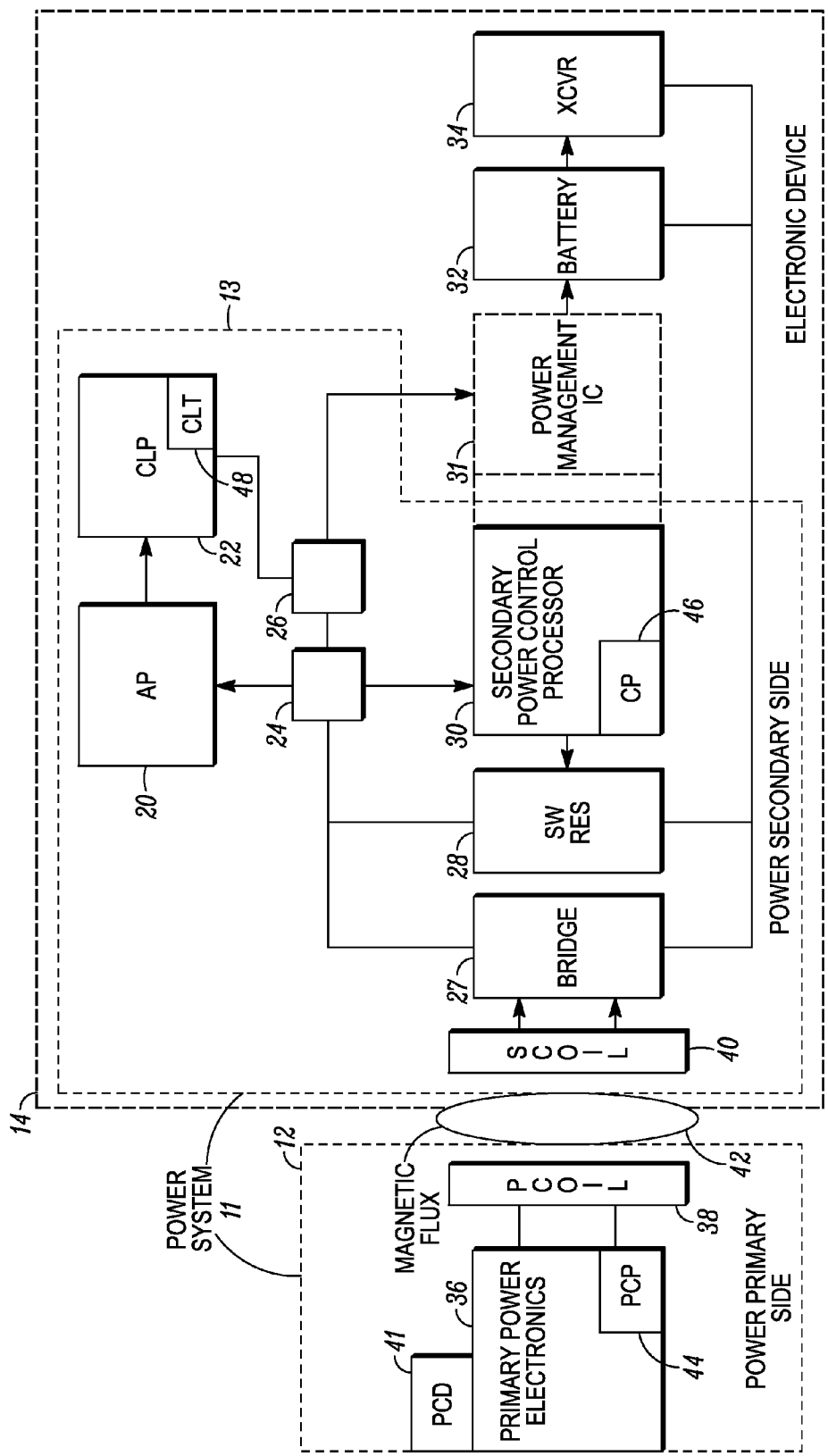
FIG. 3 is a simplified block diagram of a portable electronic device with inductive charging circuit shown generally in accordance with an illustrated embodiment of the invention.
Figure 4:
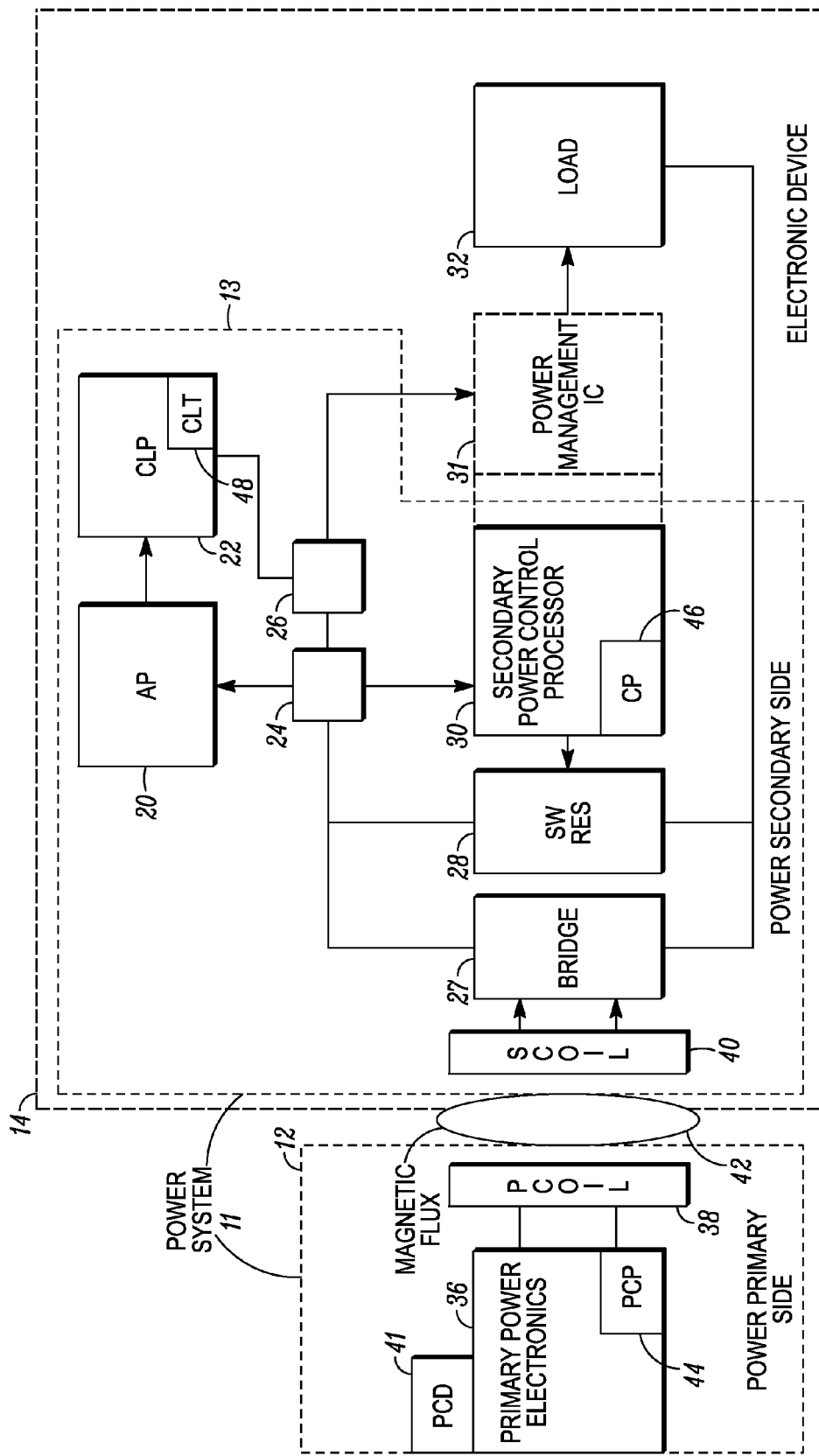
FIG. 4 is a simplified block diagram of a portable electronic device with inductive powering circuit shown generally in accordance with an alternate illustrated embodiment of the invention.

While the current limiting system described above has been described in the context of a cellular telephone, the system may have broad application such as in contexts shown in FIGS. 2 and 3. For example, the current limiting system described above may be used with any portable electric device using inductive charging and having dynamic loads. Moreover, one or more of the devices shown in FIG. 1 may be combined as shown by the dotted lines in FIGS. 2 and 3.

A specific embodiment of a power/charge control system has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. An apparatus comprising:
   a secondary charging coil receiver module configured to inductively receive a current, where the current charges a battery and powers a cellular transceiver and where the current received by the secondary charging coil is received from a primary coil of a power conversion system;
   a secondary power control processor that modulates a load to transmit charge control packets to a power control processor of the power conversion system through the primary coil;
   a current processor that measures an average current delivered through the secondary charging coil to the battery and associated electronics powered by the battery, the average current delivered includes an average of charging current and a peak transmitter current, the current processor is configured to calculate a current limit threshold value from the average current, and the threshold value includes the average current plus a predetermined incremental value; and
   a current limiter that limits the charge current to the battery and transceiver based upon the average current, the current limiter configured to substantially minimize the dynamic loading of the transceiver from corrupting a modulated load that provides transmit charge control packets to the primary coil.

2. The apparatus as in claim 1 further comprising a cellular telephone.

3. The apparatus as in claim 2 wherein the cellular telephone further comprises a GSM cellular telephone.

4. The apparatus as in claim 1 wherein the current limiter is at least one of active during charging and active during times of transmission of the charge control packets.

5. The apparatus as in claim 2 wherein the cellular telephone further comprises a time division multiplexed cellular telephone.

6. The apparatus as in claim 2 wherein the cellular telephone further comprises a GSM cellular telephone.

7. The apparatus as in claim 1 further comprising the power conversion system that inductively couples the current to the secondary charging coil receiver module.

8. The apparatus as in claim 1 further comprising a portable electronic device.

9. An apparatus comprising:
 a power conversion system comprising a primary coil; and
 a portable electronic device comprising:
  a secondary charging coil receiver module configured to inductively receive a current that charges a battery, the battery powering a cellular transceiver and where the current received by the secondary charging coil is received from the primary coil of the power conversion system;
  a secondary power control processor that modulates a load of the secondary charging coil presented to the primary coil in order to transmit charge control packets to a power control processor of the power conversion system;
  a current processor that measures an average current delivered through the secondary charging coil to the battery and associated electronics powered by the battery, the average current delivered includes an average of charging current and a peak transmitter current, the current processor is configured to calculate a current limit threshold value from the average current, and the threshold value includes the average current plus a predetermined incremental value; and
  a current limiter that limits the charge current to the battery and transceiver based upon the average current, the current limiter configured to substantially minimize the dynamic loading of the transceiver from corrupting a modulated load that provides transmit charge control packets to the primary coil.

10. The apparatus as in claim 9 wherein the portable electronic device further comprises a cellular telephone.

11. The apparatus as in claim 10 wherein the cellular telephone further comprises a GSM cellular telephone.

12. The apparatus as in claim 10 wherein the cellular telephone further comprises a time division multiplexed cellular telephone.

13. The apparatus as in claim 10 wherein the cellular telephone further comprises a GSM cellular telephone.

\* \* \* \* \*